Q. F. MESSINGER.
Improvement in Harvesters.
No. 122,630.  Patented Jan. 9, 1872.
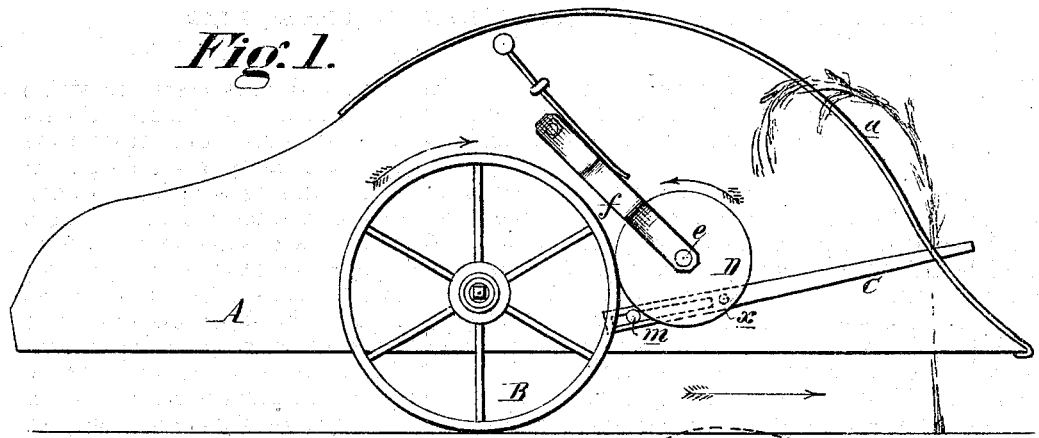
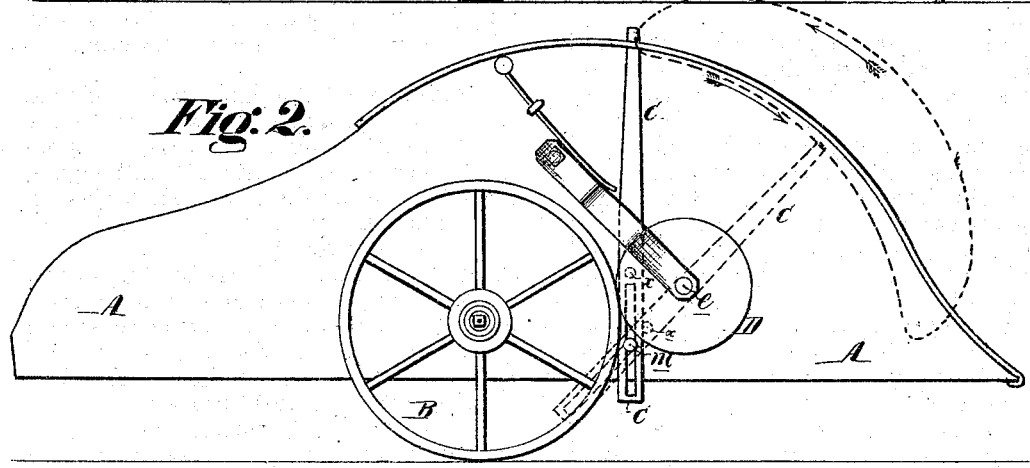
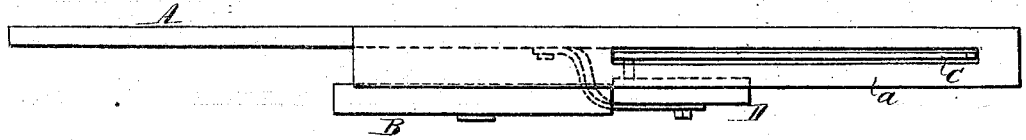

UNITED STATES PATENT OFFICE.

QUINTUS F. MESSINGER, OF EASTON, PENNSYLVANIA, ASSIGNOR TO HIMSELF, S. S. MESSINGER, AND G. F. MESSINGER, OF SAME PLACE.

IMPROVEMENT IN HARVESTERS.

Specification forming part of Letters Patent No. 122,630, dated January 9, 1872.

Specification describing an Improvement in Harvesters, invented by QUINTUS F. MESSINGER, of Easton, Northampton county, Pennsylvania.

My invention consists of an arm combined with the dividing board of a harvester, and caused to traverse in such a course, in respect to the said board, as to clear away from the outside of the latter the stalks of grain which may hang over or upon the board, and thus cause them to fall inward onto the dropper or platform so as to be carried back with the other cut grain. My invention further consists of mechanism described hereafter for operating said arm.

Figures 1 and 2 are side views of the dividing board, illustrating the clearing arm in different positions; and Fig. 3 a plan view of Fig. 1.

A represents the dividing board at the outer end of the cutter-bar of a harvester, and B the usual wheel hung to the outside of the dividing board for the support of the same and of the said cutter-bar. On the curved edge of the dividing board is a plate, $a$, through a long slot in which the end of an arm, C, traverses in a manner and for a purpose explained hereafter. This arm C is connected to a pin, $x$, on the crank-wheel D secured to a spindle $e$, which turns in the dividing board and in a plate, $f$, secured to the outside of the same, the crank-wheel D deriving its motion in the present instance from the wheel B. The arm C has near its inner end an elongated slot, through which passes a pin, $m$, fixed to the dividing board; the arm will consequently vibrate as well as turn on the said pin as the crank-wheel D revolves. As the dividing board moves in the direction of the arrow, Fig. 1, the wheels B and D will turn in the direction of their arrows, and the outer end of the arm C will pursue the course pointed out by dotted lines in Fig. 2.

In cutting grain with harvesters the stalks immediately inside of and adjacent to the dividing board are apt to drop over or onto the same with the heads hanging outside, from which position it is sometimes difficult to dislodge them. In Fig. 1, for instance, I have shown by dotted lines a stalk in the act of drooping over the edge of the dividing board; the arm C, however, constantly pursuing the course pointed out in Fig. 2, necessarily clears away these stalks by throwing their heads inside the dividing board, and thus prevents the encumbering of the latter with a mass of such stalks. When thus thrown over onto the platform by the vibrating arm the stalks are carried or pass back as usual with the other cut grain.

It is immaterial what mechanism is employed for imparting the desired movement to the arm C, provided it pursues a course substantially as described and illustrated; although I, in most cases, prefer the device shown as being simple and effectual.

I claim as my invention—

1. The combination, with the dividing board, of the operating devices described, or their equivalents, and an arm, C, the outer end of which is caused to traverse the course illustrated and described, in respect to the edge of the dividing board, for the purpose specified.

2. The said arm C, its slotted end adapted to a pin, $m$, the crank or crank-wheel D, and wheel B, all combined with a dividing board, substantially in the manner described.

In testimony whereof I have signed my name to this specification in the presence of two subscribing witnesses.

Q. F. MESSINGER.

Witnesses:
 A. C. SANDT,
 MILTON H. BUCHECKER. (74)